United States Patent
Sadjian

[11] 3,771,874
[45] Nov. 13, 1973

[54] PYROMETER USING A PASSIVE LINE SHAPE SPECTRAL FILTER

[75] Inventor: Harry Sadjian, Southampton, Pa.

[73] Assignee: The United States of America as represented by the Secretary of the Air Force, Washington, D.C.

[22] Filed: July 14, 1972

[21] Appl. No.: 271,946

[52] U.S. Cl............... 356/43, 73/355 R, 356/114
[51] Int. Cl. ............................................. G01j 5/48
[58] Field of Search ........................... 356/43, 114; 250/225; 73/355; 350/148

[56] References Cited
UNITED STATES PATENTS
3,462,224    8/1969    Woods et al. ....................... 356/43

Primary Examiner—David Schonberg
Assistant Examiner—V. P. McGraw
Attorney—Harry A. Herbert, Jr. et al.

[57] ABSTRACT

Temperature of a gas is determined by impinging on the gas a laser beam which broadens its spectral line. The beam passes through a limiting interference filter and then to a first Wollaston prism that polarizes the beam into two channels, one of which is directed through a birefringent prism and then to a second Wollaston prism where the beam is again divided into two channels. The pair of outputs of the second Wollaston prism are amplified by photomultipliers and then compared to find the ratio of the two channels which is a measure of the line width. The broadening of the spectral line is compared to the original laser line and is indicative of the plasma temperature.

2 Claims, 4 Drawing Figures

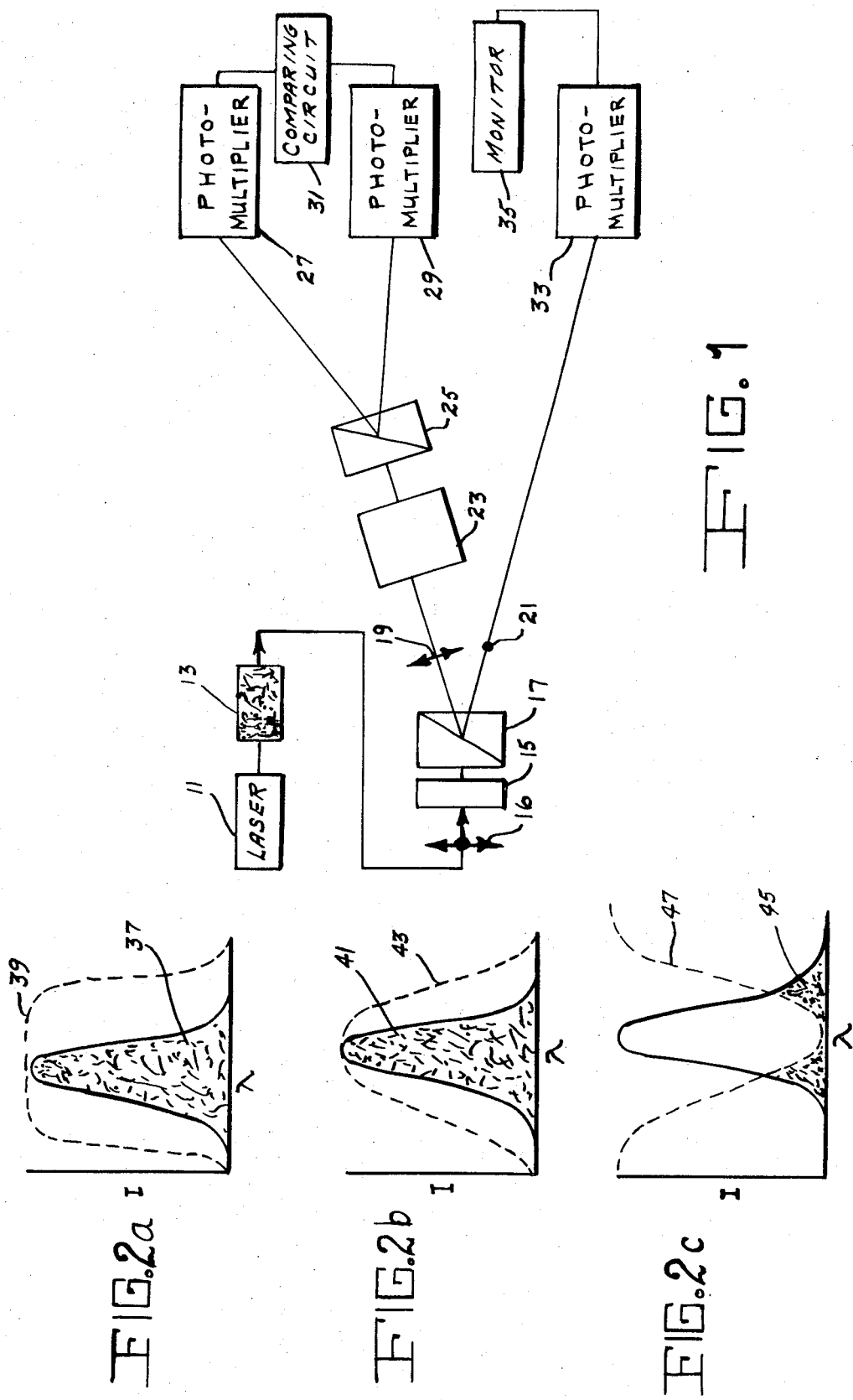

PYROMETER USING A PASSIVE LINE SHAPE SPECTRAL FILTER

BACKGROUND OF THE INVENTION

This invention relates to a system for determining the temperature of gas and more particularly to a menas for measuring the spectral broadening of a laser line.

The line shape spectral filter passively determines the half width of a symmetrically broadened line in order to determine the temperature of the species generating the line.

In previous devices a scanning system has been necessary to determine line width requiring expensive electronic or mechanical systems. In the present system the line width of Thomson scattered lines in an arc plasma and shock tunnel can be determined with greater efficiency and economy than that used in the past. This is a passive system not requiring any electronic driver. Polarized light coming from the Wollaston and containing the Thomson scattering line profile is passed through a Lyot birefringent filter. This is followed by a second Wollaston prism and two photomultipliers instead of one. The usual Lyot filter consists of a polarizer, a retardation plate and a second polarizer either parallel or crossed with the first. With white light passing through the system, the Lyot filter produces a channeled spectrum. Those wavelengths which are retarded an integral number of wavelengths pass through the second polarizer. Those wavelengths which are retarded one-half integral wavelength are blocked by the second polarizer. Wavelengths in between are passed to a lesser or greater degree. In effect the spectrum becomes cos squared or sin squared modulated in wavelength depending on whether the polarizers are crossed or parallel. In the invention both polarizers are replaced by Wollaston prisms so that both modulated spectra can be recorded. As one modulated spectrum is complementary to the other no light is rejected by the system.

Base on previous work on Thomson scattering it can be assumed that the spectral profile is symmetrical. In order to determine the electron temperature it is sufficient to determine the half width of the line. If one polarization channel is chosen to coincide with the peak of the Thomson profile, then it will record essentially the line profile. The second polarization channel will record only part of the profile. The filter is used to limit the cos squared or sin squared curve to one cycle. As the half width of the line changes, more or less energy will be recorded by the second polarization channel. By rationing both channels it should be possible to recover the half width of the line.

SUMMARY OF THE INVENTION

The present invention operates on the principle that light transmitted between crossed or parallel polarizers through a birefringent plate is modulated spectrally as sine squared or cosine squared. If, however, the second polarizer (analyzer) is replaced by a Wollaston prism, both the sine squared or the cosine squared light is transmitted. If the light contains a broadened spectral line, then part of the line is transmitted through the sine squared channel and part through the cosine squared channel. The ratio of these two channels is a measure of the line width provided the line shape is symmetrical.

It is therefore an object of this invention to provide a system for determining the temperature of gas or plasma.

It is another ovject to provide the method and system for measuring the doppler broadening of a laser line.

It is still another object to provide a line shape spectral filter for passively determining the half width of a symmetrical broadening line.

These and other objects, features and advantages of the invention will become more apparent from the following description taken in connection with the illustrative embodiments of the drawings:

DESCRIPTION OF THE DRAWINGS

FIG. 1 is a schematic drawing showing the embodiment of the invention; and

FIGS. 2a through 2c are graphs showing output curves taken from selective points from the embodiment shown in FIG. 1.

DETAILED DESCRIPTION OF THE PREFERRED EMBODIMENT

A beam of coherent light from laser 11 passes through sample plasma 13 and then to limiting interference filter 15. At this state the light is still nonpolarized as shown by arrow 16 with the center dot. From interference filter 15 the light passes through to Wollaston prism 17 which polarizes the light into two components as shown by arrows 19 and dot 21 which is in effect an arrow perpendicular to the plane of the drawing. One channel of polarized light passes through to birefringent plate 23 and then through second Wollaston prism 25 where the output is both sine squared and cosine squared. The outputs of Wollaston crystal 25 are then amplified by photomultiplies 27 and 29 and compared in comparing circuit 31. The ratio of the two channels is a measure of the line width, provided the line shape is symmetrical. The second channel from Wollaston prism 17 is fed to photomultiplier 33 and then to monitor 35.

FIGS. 2a–2c show Thomson scattering lines in an arc plasma. FIG. 2a shows Thomson profile 37 modified by curve 39. This is the output taken from Wollaston prism 17. The two outputs of Wollaston prism 25 are shown in FIG. 2b where Thomson profile 41 is modified by sine squared curve 43 and in FIG. 2c where Thomson profile 45 is modified by cosine squared curve 47.

Calibration of the invention was accomplished by the superposition of the experimentally derived transmission curves for the sine squared and cosine squared channels and the theoretical line profiles. Subsequent graphical intergration resulted in a ratio response curve for the detector system as a function of electron temperature. This was done for the scattering angle of 150° where the testing is performed. The ratio response curve indicates a ratio change of from 2.00 to 0.20 in going from 10,000°K to 3,000°K.

The detector system and laser system were set up on a free jet arc. The laser can Q-switch approximately 1 joule; however, in additoion to the main beam, a highly divergent beam is produced which requires some masking. The laser beam is focused with a 16-inch focal length producing a focused region of approximately 2 × 3 mm. Due to the smaller area of the entrance to the detector system (0,25 × 0.75 mm) all the available energy is not utilized (approximately 30 percent). Several preliminary tests were made to determine the amount of residual scattering without the arc present.

What is claimed is:

1. A system for determining the temperature of a plasma comprising:
   a. a laser having a beam passing through the plasma;
   b. a first Wollaston prism in the path of the laser beam after the beam has passed through the plasma and having first and second output paths;
   c. a birefringent plate in the path of the first output beam of the first Wollaston crystal;
   d. a second Wollaston prism in the path of the beam passing through the birefringent plate;
   e. a pair of photomultipliers in the path of the outputs of the second Wollaston prism for aplifying thereof; and
   f. a comparing ciruit fed by the pair of photomultipliers, the output thereof being indicative of the plasma temperature.

2. A system for determining the temperature of a plasma according to claim 1 which further comprises a limiting interference filter interposed between the plasma and the first Wollaston prism.

* * * * *